No. 844,484. PATENTED FEB. 19, 1907.
F. L. O. WADSWORTH.
MANUFACTURE OF WIRE GLASS.
APPLICATION FILED JAN. 30, 1905.
2 SHEETS—SHEET 1.
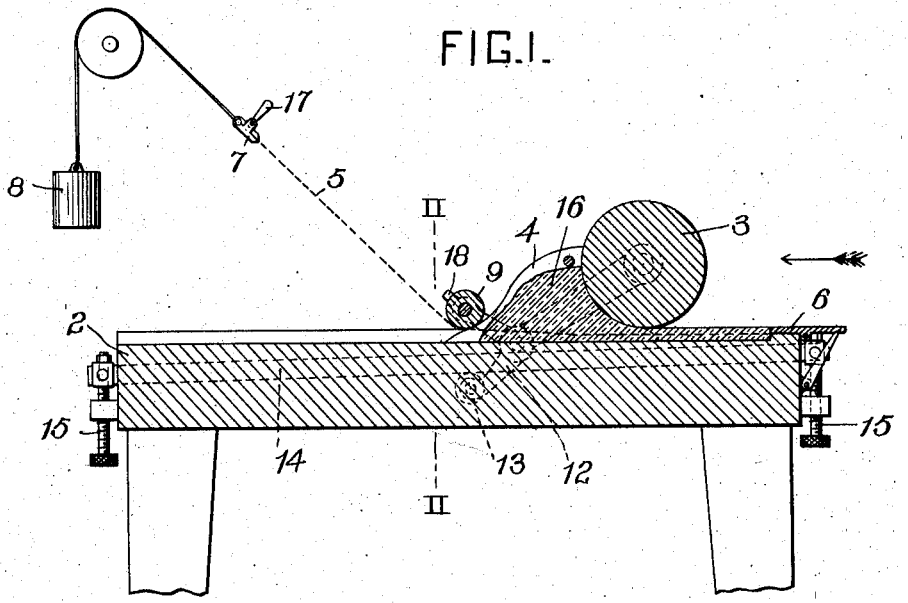
FIG.1.
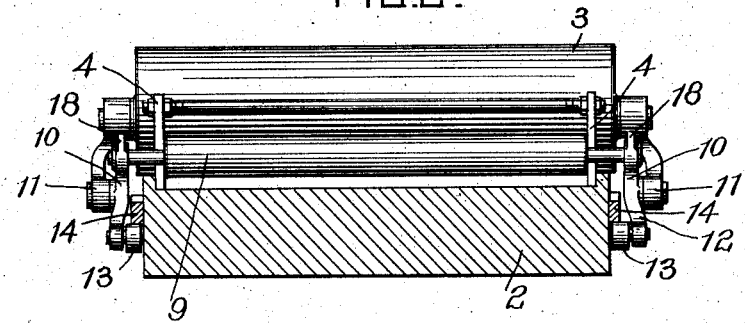
FIG.2.
FIG.3.
FIG.4.
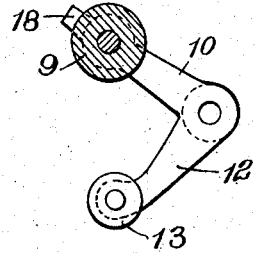
WITNESSES:
Herbert Bradley.
Fred Kirchner.
INVENTOR
Frank L. O. Wadsworth,
by Christy & Christy, Atty's No. 844,484. PATENTED FEB. 19, 1907.
F. L. O. WADSWORTH.
MANUFACTURE OF WIRE GLASS.
APPLICATION FILED JAN. 30, 1905.

2 SHEETS—SHEET 2.

WITNESSES:
Herbert Bradley.
Fred Kirchner.

INVENTOR
Frank L. O. Wadsworth,
by Christy & Christy, Atty's

UNITED STATES PATENT OFFICE.

FRANK L. O. WADSWORTH, OF MORGANTOWN, WEST VIRGINIA, ASSIGNOR TO PRESSED PRISM PLATE GLASS COMPANY, OF MORGANTOWN, WEST VIRGINIA, A CORPORATION OF WEST VIRGINIA.

MANUFACTURE OF WIRE-GLASS.

No. 844,484.      Specification of Letters Patent.      Patented Feb. 19, 1907.

Application filed January 30, 1905. Serial No. 243,330.

*To all whom it may concern:*

Be it known that I, FRANK L. O. WADSWORTH, residing at Morgantown, in the county of Monongalia and State of West Virginia, a citizen of the United States, have invented or discovered a certain new and useful Improvement in Manufacture of Wire-Glass, of which improvement the following is a specification.

The purpose of my invention is to incorporate wire mesh or like material in a single homogeneous sheet of glass; and it consists in a new and improved method of attaining this result.

The invention is particularly adapted to the manufacture of wire-glass at one cast or from one pour as distinguished from the formation of the sheet in two distinct layers between which the wire mesh is incorporated or embedded.

In the practice of my invention I take a sheet of wire mesh or wire fabric or like material which is to be embedded in the glass and hold it under tension at a distance from the table or other forming-surface sufficient to embed it in the glass sheet to any desired depth. I then roll or otherwise spread a mass of plastic glass over the mesh thus held in position, causing the glass to pass through the interstices of the mesh and to embed the mesh in the sheet, meanwhile constantly maintaining the tension upon the mesh, so as to hold it taut and take up any slack which may be caused by expansion of the wire by reason of the heat communicated to it from the plastic glass.

In the accompanying drawings I have shown apparatus suitable for the practice of my improved method of manufacture; but my invention is not limited in respect of the apparatus employed, since such may be modified or changed in many ways.

Figure 5:
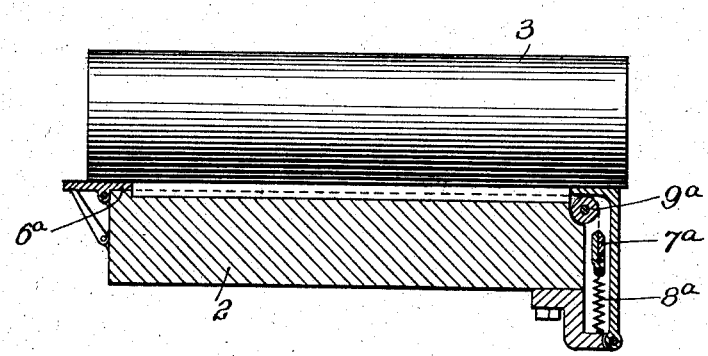
Figure 6:
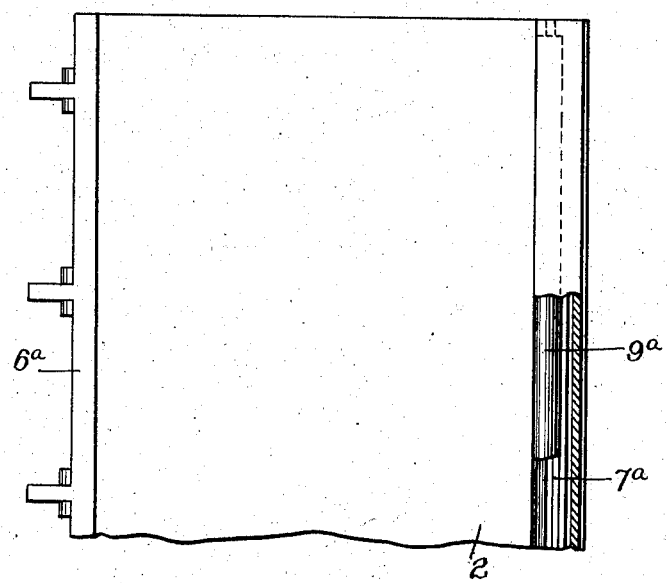

Referring to the drawings, Figure 1 is a horizontal central section of an apparatus adapted to the practice of my invention. Fig. 2 is a vertical section thereof, taken on the line II II of Fig. 1. Fig. 3 is a detail view of the rock-lever upon which the wire-guiding roll is mounted. Fig. 4 is a plan view of a preferred form of clamp for the wire. Fig. 5 is a vertical cross-section of a table, showing a modified arrangement of the means for holding the wire. Fig. 6 is a plan view of the table shown in Fig. 5, partially broken away; and Fig. 7 is a side view of such table, also partially broken away.

Referring first to Figs. 1 to 4, 2 is the table on which the glass sheet is formed, and 3 is a roll which may travel longitudinally over the table, or the table may be made to travel in the reverse direction under the roll. This roll is mounted on a carriage provided with the usual guns 4 for confining the molten glass and preventing it from spreading laterally beyond the limits of the table. 5 is the sheet of wire mesh which is to be embedded in the glass. It is fixed at one end to a clamp 6 of any suitable form on the table, and at the other end is attached, by means of a clamp 7 or otherwise, to a weight 8 or other device adapted to exert a constant tension upon the mesh. Instead of making the clamp 7 to extend continuously from edge to edge of the wire mesh I may make it in sections and apply a tension device to each section; but I prefer to accomplish the same purpose by using a flexible clamp and a number of tension devices at different points of its length, as illustrated in Fig. 4. The mesh proper extends under a roller 9, suitably mounted on the roll-carriage, but preferably carried on a rock-lever or other adjustable device 10, which when the rock-lever is employed is pivoted on the roll-carriage at 11 and has an arm 12, fitted with an antifriction-roller 13, traveling on the under side of a guide-strip 14. This guide-strip has at the ends suitable adjusting mechanism 15, by which its vertical position and its inclination may be varied. The purpose of thus mounting the roller 9 is that by raising the guide-strip the roller 9 is permitted to rise, and thus to allow the mesh to assume a position higher from the table, and by lowering it the roller 9 is brought nearer to the table. If the guide-strip be set at an inclination, as shown in dotted lines in Fig. 1, the roller 9 will be brought nearer to the table toward the end of the operation, and this is generally desirable, because it compensates for the changes in the weight of the mass of glass, which being heavy at the beginning of the speading of the sheet tends to cause the sheet to sag, which tendency gradually decreases as the operation progresses. The adjustment may be made in any other way desired to compensate for the varying pressure of the glass on the top of the mesh. While I prefer to thus vary the distance of the wire mesh from the forming-surface, my invention is not limited thereto, except in respect of those of the claims hereto appended in which such variation is specifically mentioned.

In the practice of my invention I adjust the wire mesh, as shown in the drawings, and then, having retracted the roll to the rear end of the table, I place a mass 16 of molten glass between the guns 4 and move the roll-carriage forward in the direction of the arrow. As the roll-carriage advances it will hold the wire mesh in a state of tension and at exactly the distance desired above the level of the table, and the roll will spread the glass into the form of a sheet, pressing it through the interstices of the wire mesh against the surface of the table. As the carriage advances farther portions of the wire mesh will be brought progressively into the desired horizontal position above the table, and when the end of the sheet has been reached a trip-arm 17 on the clamp 7 will preferably engage the portion 18 of the roll-carriage and will automatically release the clamp from the wire mesh, so that the loose end of the mesh will be embedded in the glass. The glass sheet is then put in the annealing-oven.

Figure 7:
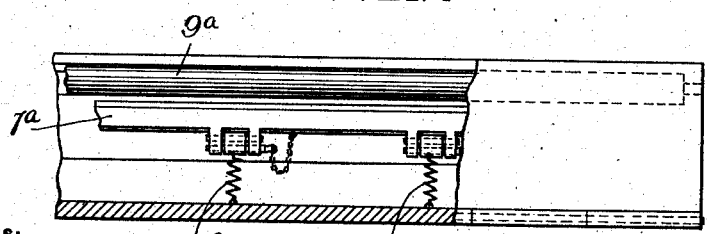

In Figs. 5, 6, and 7 I have illustrated an apparatus in which the wire mesh is held transversely of the table. As therein shown, there is provided on one side of the table a fixed clamp 6$^a$ of suitable form and on the other a roller 9$^a$, over which the edge of the wire mesh passes and upon which the mesh is held by the clamp 7$^a$, which is yieldingly secured to a depending extension or bracket fastened to the table by tension-springs 8$^a$.

My invention has important advantages. By holding the wire mesh under constant tension at the desired distance from the forming-surface I am enabled to form the finished sheet of wire-glass from one batch of metal in one operation. After the wire has touched the glass it is not again exposed to the air. Oxidation of the wire is thereby prevented, and sheets are thus made much freer from bubbles than has heretofore been possible. Moreover, when my invention is practiced the body of molten glass is in contact with successive portions of the mesh for some time before the actual rolling pressure takes place, so that before the glass is spread at any given place the mesh has had time to assume the temperature of the molten glass and to have expanded to its full extent.

I am aware that it has been proposed to incorporate the wires of a mesh in ribs formed on one or both sides of a glass plate. In forming such plates the mesh which corresponds to the desired arrangement of ribs is placed under tension and is forced into the rib-forming grooves and below a large portion of the forming-surface by a roller in front of the glass-spreading roller. As the web expands when heated by the glass, the transverse wires will bear against the walls of the grooves, and thus prevent the wire in the rear of such anchorage being subjected to any tension, further expansion causing the wire to simply sag down into the grooves. In operating such an apparatus the wire mesh is not held above the forming-surface and in spaced relation thereto by the tension applied to such mesh.

I claim herein as my invention—

1. The method of making wire-glass which consists in placing the mesh under tension to support it above and in spaced relation above a forming-surface, pouring molten glass on the wire mesh, causing glass to pass through interstices of the mesh and embed the same in the body of the glass, and maintaining the mesh under tension in substantially the same spaced relation while being embedded in the glass.

2. The method of making wire-glass which consists in placing the mesh under tension to support it above and in spaced relation above a forming-surface, pouring molten glass on the mesh, causing glass to pass through interstices of the mesh and embed the same in the body of the glass and maintaining the mesh under constant tension and thereby in said spaced relation while being embedded in the glass.

3. The method of making wire-glass which consists in placing the mesh under tension with a portion of the mesh extending upwardly, progressively forcing the mesh into spaced relation above a forming-surface, pouring molten glass onto the portion of the mesh in spaced relation to the forming-surface, causing glass to pass through interstices of the mesh and maintaining the tension on the mesh and embed the same in the body of the glass.

4. The method of making wire-glass, which consists in holding a sheet of wire mesh under yielding tension, spreading a mass of molten glass over and through the wire mesh, and varying the distance at which the sheet is held from the forming-surface to compensate for the varying pressure of the glass.

5. The method of making wire-glass, which consists in holding a sheet of wire mesh under constant tension, spreading the mass of molten glass over and through the wire mesh, varying the distance at which the sheet is held from the forming-surface to compensate for the varying pressure of the glass, releasing the tension on the sheet before the completion of the operation, and embedding the end of the mesh in the glass.

In testimony whereof I have hereunto set my hand.

FRANK L. O. WADSWORTH.

Witnesses:
CHARLES BARNETT,
HERBERT BRADLEY.